US012100380B2

(12) United States Patent
Armstrong et al.

(10) Patent No.: US 12,100,380 B2
(45) Date of Patent: Sep. 24, 2024

(54) AUDIO CANCELLATION SYSTEM AND METHOD

(71) Applicant: Sony Interactive Entertainment Inc., Tokyo (JP)

(72) Inventors: Calum Armstrong, London (GB); Michael Lee Jones, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/840,990

(22) Filed: Jun. 15, 2022

(65) Prior Publication Data

US 2022/0406287 A1 Dec. 22, 2022

(30) Foreign Application Priority Data

Jun. 18, 2021 (GB) ...................................... 2108745

(51) Int. Cl.
*G10K 11/178* (2006.01)

(52) U.S. Cl.
CPC .. *G10K 11/17881* (2018.01); *G10K 11/17827* (2018.01)

(58) Field of Classification Search
CPC .................... G10K 11/17881; G10K 11/17827
USPC ......................................................... 381/71.1
See application file for complete search history.

(56) References Cited

U.S. PATENT DOCUMENTS 8,295,502 B2 * 10/2012 Marton ............... G10L 21/0208 381/94.1
9,802,123 B2 10/2017 Soelberg
11,776,555 B2 10/2023 Bergeron
2004/0213419 A1 10/2004 Varma
2005/0047611 A1 3/2005 Mao
2011/0223997 A1 9/2011 Mao
2013/0343555 A1 * 12/2013 Yehuday ............... A63F 13/215 381/71.1
2014/0119569 A1 * 5/2014 Peeler ................... H04M 1/724 381/94.1
2016/0360314 A1 * 12/2016 Iyengar .................. H04R 3/005

FOREIGN PATENT DOCUMENTS

EP 2608198 A1 6/2013
WO 2005104091 A2 11/2005
WO 2020017518 A1 1/2020

OTHER PUBLICATIONS

Extended European Search Report for corresponding EP Application No. 22179378.9, 13 pages, dated Oct. 31, 2022.

(Continued)

*Primary Examiner* — Vivian C Chin
*Assistant Examiner* — Douglas J Suthers
(74) *Attorney, Agent, or Firm* — Matthew B. Dernier, Esq.

(57) ABSTRACT

A system comprising a feedback device comprising one or more elements operable to generate an output in response to an input from a processing device, a microphone operable to capture one or more audio inputs, an input detection unit operable to detect one or more inputs to the feedback device from the processing device, and a response generation unit operable to generate a response to the detected input in dependence upon the input and at least a distance between an element associated with the corresponding output and the microphone.

13 Claims, 6 Drawing Sheets

100

(56) References Cited

OTHER PUBLICATIONS

Extended European Search Report for related EP Application No. 22179393.8, 13 pages, dated Nov. 11, 2022.
Combined Search and Examination Report for related GB Application No. GB2108740.8, 6 pages, dated Dec. 7, 2022.
Combined Search and Examination Report for corresponding GB Application No. GB2108745.7, 4 pages, dated Dec. 7, 2022.
Examination Report under Section 18(3) for related GB Application No. 2108740.8. 3 pages dated Nov. 27, 2023.
EPO Communication 94(3) for related EP Application No. 22179393.8. 7 pages dated Jul. 2, 2024.
EPO Communication 94(3) for corresponding GB Application No. 22179378.9. 8 pages dated Jul. 2, 2024.

* cited by examiner

AUDIO CANCELLATION SYSTEM AND METHOD

BACKGROUND OF THE INVENTION

Field of the Invention

This disclosure relates to an audio cancellation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the increase in the availability of high-speed internet connections, online voice communication has become a much more widespread feature. The increased usage of online voice communication has accelerated further in recent years due to both social factors (such as the Covid-19 pandemic which has led to a reduction in people meeting in person) and technological factors. Increasing numbers of devices are now provided with high-quality microphones that are useful for capturing audio for transmission—examples include laptops, mobile phones, and games consoles (and/or their associated controllers).

While online voice communication is used for many purposes, such as social calls and work meetings, they have found particular relevance within the gaming community. This can include both multiplayer gaming contexts (so as to enable competitors and/or team mates to communicate) and video game streaming contexts (in which a single player provides video of their gameplay, and optionally themselves with an audio commentary, to a number of viewers who are not playing the game).

However, with this increasing use of microphones for voice communication there are a number of issues. One such issue is issue is that of environmental sounds that are also picked up by a microphone—these can be distracting and/or annoying for listeners, as well as possibly making it difficult to hear the speaker. Existing arrangements address this by providing a push-to-talk (or similar) functions, thereby reducing the amount of time that a microphone is transmitting, or through software-based noise suppression techniques that isolate the user's voice in captured audio.

Such techniques can be inconvenient for a user when requiring inputs to control the audio quality, or can place a significant processing burden upon a system to perform noise suppression. This can lead to audio content to be of reduced quality (for example, by distracting a user or introducing a significant latency) in order to preserve the quality of the audio itself.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
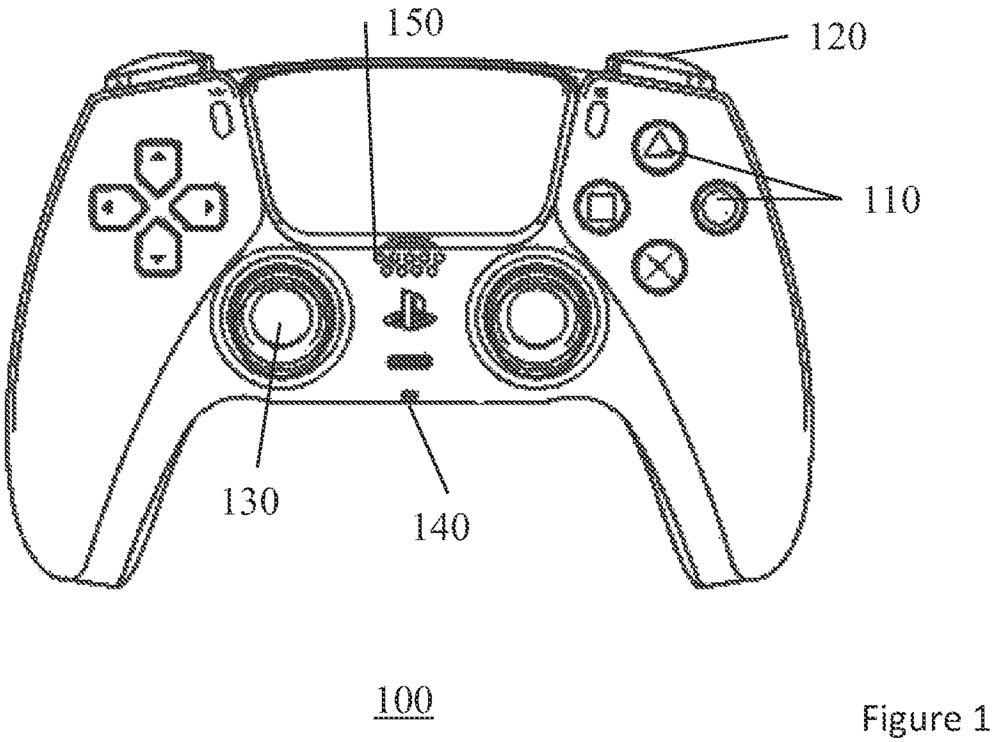
FIG. 1 schematically illustrates a handheld controller.

Referring now to the drawings, wherein like reference numerals designate identical or corresponding parts throughout the several views, embodiments of the present disclosure are described.

FIG. 1 schematically illustrates an example of a games controller 100 suitable for implementing a number of embodiments of the present disclosure.

The games controller 100 is configured to transmit one or more inputs, provided by a user of the controller 100, to a processing device (such as a games console). These inputs may comprise signals indicating the operation of one or more of the buttons 110, triggers 120, or joysticks 130. The controller 100 may also comprise one or more hardware motion detectors (such as accelerometers or gyroscopes) that are able to detect motion of the controller 100; the controller 100 may generate one or more inputs to the processing device to control the operation of the device (and/or one or more applications being executed by the device, such as a computer game). The controller 100 may further comprise one or both of a microphone 140 and a speaker 150; these enable sound input by a user and sound output to a user respectively.

The controller 100 may be further configured to receive inputs from an associated processing device, rather than just from the user. Examples of such inputs may include audio inputs (for output by a speaker associated with the controller) or haptic inputs that are used to control one or more haptic feedback elements such as a rumble feature.

In some embodiments, the controller 100 may comprise one or more processing units that are operable to perform functions at the controller 100; this may be advantageous in that this processing burden is not placed onto the associated processing device, and processing (such as input detection)

can be performed with a lower latency due to not requiring signals to be transmitted to the processing device for processing.

Of course, any suitable configuration of a controller may be considered appropriate for use in embodiments of the present disclosure; the only requirements are that the device is operable to receive inputs from a user, and that operation of the controller causes sound to be generated.

Figure 2:
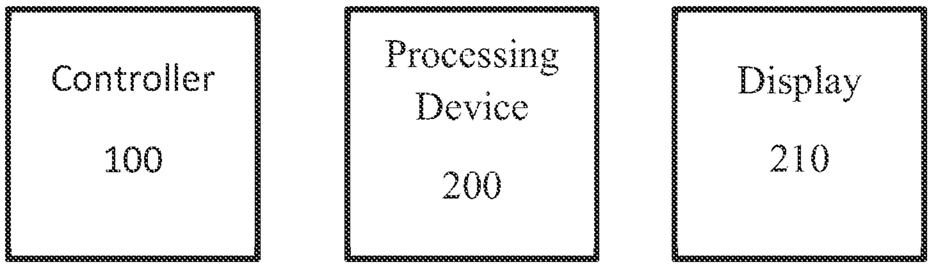
FIG. 2 schematically illustrates a processing system.

FIG. 2 schematically illustrates an example of a system in which such a controller may be used; this system comprises one or more controllers 100, a processing device 200, and a display 210. One example of a system according to FIG. 2 is that of a games console that is provided with a number of controllers for a user to provide inputs, and a display upon which to show gameplay to the users. Similarly, a personal computer may be provided as the processing device 200 rather than a games console; in such a case, the one or more controllers 100 may include a keyboard and/or a mouse or any other suitable input device.

While FIG. 2 shows that the elements of the system are separate, it is considered that in a number of embodiments they may be distributed amongst a number of devices smaller than the number of elements. A first example of this is the use of a laptop, in which a keyboard, processing unit, and display are each incorporated into a single physical unit—therefore each of the elements shown in FIG. 2 are incorporated into a single device in such an example. Similarly, handheld games consoles or mobile phones may be a further example. Mobile phones or tablets are often used with a separate games controller (via a wired or wireless connection); such arrangements are examples of an integrated processing device 200 and display 210 with a separate controller 100. In addition to such examples, it is also considered that a controller 100 and processing device 200 may be provided as a single unit with a separate display; examples of this include devices which offer a screen sharing or casting function that enables a display device to be selected freely. For instance, handheld game controllers (comprising processing elements) have been provided in the past that plug directly into a television to provide a gaming experience to a user.

In view of the above discussion it is apparent that while much of the discussion provided relates to games controllers of the type shown in FIG. 1 alongside a games console, the concepts taught are applicable to a much broader range of devices.

Figure 3:
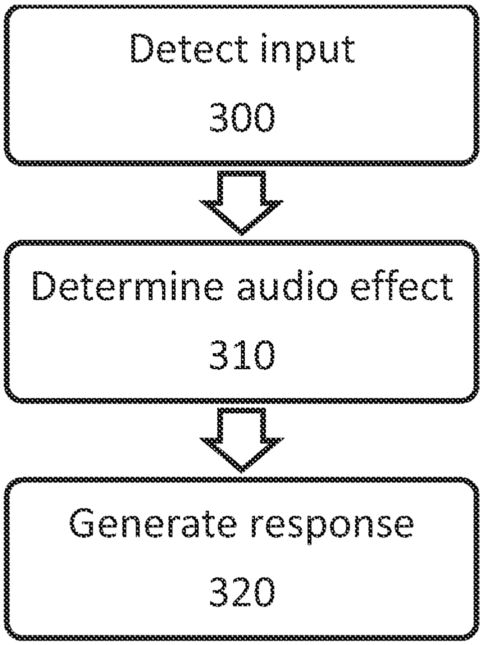
FIG. 3 schematically illustrates an audio mitigation method.

FIG. 3 schematically illustrates an example of a method according to one or more embodiments of the present disclosure. Such a method is used to mitigate the impact of the sound associated with inputs (such as button presses or haptic feedback) upon captured audio within the environment of the controller, for example using a microphone located on the controller or located at a processing device, or a separate microphone (such as a headset worn by a user of the controller). Such a method can therefore be used to mitigate the impact of button presses and the like upon captured audio, such as a commentary provided by a player of a game, audio inputs for controlling a processing device, or conversation between friends.

At a step 300, one or more inputs that are provided to a controller are detected. This may include inputs provided by a user, such as operation of one or more buttons (simultaneously or in succession), or inputs provided by an associated processing device such as audio inputs or haptic feedback generation inputs.

This detection may be performed in a number of ways; in some embodiments that detection is performed based upon the detection of the operation of a button (or the like) by the controller, while in others the generation of a haptic feedback signal is detected at a processing device or the controller. Further examples of such a detection are discussed below.

At a step 310, an audio effect associated with the detected inputs is determined. This may be performed in any suitable way for the input—in some embodiments this may be performed by detecting a button press and using a look-up table or the like to identify a corresponding sound. Alternatively, or in addition, the sound of an input being provided may be detected using a microphone. A further alternative or additional example is that of determining audio associated with the implementation of a signal provided to the controller, such as determining audio that would result from generation of haptic feedback in accordance with a provided haptic feedback generation signal.

The determination of the audio effect may comprise the use of information about the propagation of the audio between the sound source and a microphone associated with the controller and/or user. For instance, a distance between the audio source and the microphone may lead to a notable difference in the audio level between the emitted and received sounds. Similarly, different propagation paths may lead to changes in pitch or volume, for instance; this can be caused by the structure of the controller itself in some cases, as audio conduction through plastic elements may lead to a significant difference between the emitted and received audio. Using information about the controller (such as the structure, materials, and location of input/output elements) or prior testing may therefore be useful in determining the audio effect associated with an input.

At a step 320 a response is generated that reduces the impact of the audio effect on audio captured by a microphone in the environment of the controller. In some embodiments this may comprise applying processing to a captured audio signal in dependence upon the determined audio effect so as to perform a noise cancelling function. Alternatively, or in addition, a speaker associated with the controller may be controlled to emit a signal that is received by the microphone, the signal being determined so as to provide a noise cancellation function in respect of the audio effect associated with the input.

In accordance with the method of FIG. 3, arrangements may be provided that enable a noise cancellation style process to be performed for audio generated through operation of a controller. Such arrangement are advantageous in that they leverage existing knowledge (such as the audio emitted by an input) to enable more efficient processing to reduce the impact of unwanted audio in a captured audio stream. Such arrangements may also be advantageous in that they are performed in association with an audio capture process rather than an audio playback process as in traditional noise cancellation—this can therefore be more efficient for audio reproduction, as well as leading to a higher quality of captured audio as the amount of unwanted noise can be reduced during the capture process.

As noted above, the identification of properties of the controller or the inputs themselves in advance can assist with providing an efficient implementation of methods according to the present disclosure. Such properties may be derived from modelling of a device (for example, considering the relative arrangement of elements such as buttons and microphones and the materials and/or shape of the controller), or from testing in which inputs are provided and the audio output associated with those inputs recorded. Such properties are advantageous in that it can be determined in advance how the expected (unwanted) sounds will sound in the captured audio.

It is envisaged that in many cases the emitted sound for an element is able to be determined in advance, which can enable a modelling process. For example, the different operation modes of a haptic feedback element may be known, and the materials and forces on different buttons and triggers may be determined. The use of a modelling process may be advantageous in the case that the audio impact is dependent upon the user that is using the controller or environmental factors—such as whether a stronger grip or larger hands dampens the transmission of audio through the controller, or whether using a keyboard generates different sounds in dependence upon the surface on which the keyboard rests (for example, a harder surface such as a desk may lead to a noisier use than a softer surface such as the user's legs).

In some cases, such an identification may be provided on a per-element basis—for example, information may be generated for operation of a particular button or trigger or a particular haptic feedback element. This may be suitable as the location of the particular element is fixed within the controller; therefore spatial components of the identification can be constant. Such an approach may be particularly suited when there are a large number of distinct inputs, which can lead to a large number of possible actions, as this can be a simplified manner for representing the identification information.

Alternatively, or in addition, the identification may be provided on a per-action basis; for instance, a particular operation of an input. An example of this may be a particular operation of a haptic feedback element (such as a specific rumble pattern defined by particular frequencies and amplitudes) or button (for example, a trigger with multiple input options may generate different sounds for a half-press action and a full-press action). Such an approach may be particularly suitable when considering embodiments in which the provision of an input is determined from signals generated for/by those inputs as the action can be easily derived in such cases.

Further alternative (or additional) methods of generating and storing identified properties may also be appropriate; the above examples should not be regarded as limiting upon this disclosure. For instance, an identification may be performed that identifies a spatial dependency for the audio effect with respect to a microphone position that is used to modify the expected impact on the captured audio.

Two exemplary methods for implementing embodiments of the present disclosure are described with reference to FIGS. 4 and 5; the former relates to the provision of user inputs (such as button presses) while the latter relates to the provision of inputs to the controller (such as haptic feedback or audio outputs). While there are differences in the respective methods, it is considered that each provides useful background for the other as there are significant similarities between the methods.

Figure 4:
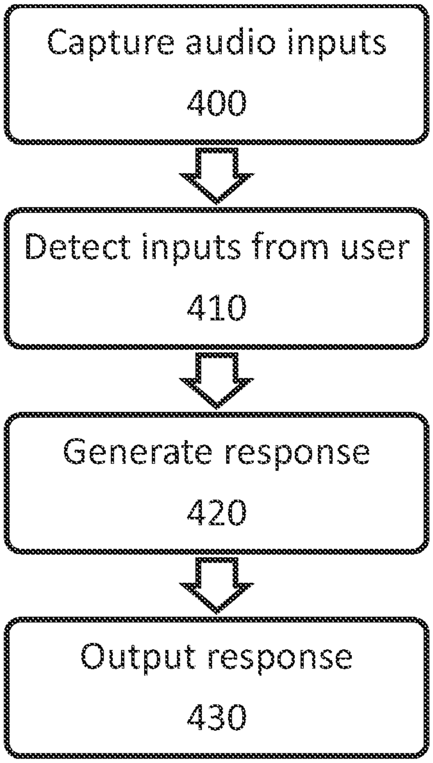
FIG. 4 schematically illustrates a method for generating a response to a detected input by a user.

FIG. 4 schematically illustrates a method for generating a response to a detected input by a user, the response being used to modify captured audio. The detected inputs may include operation of physical elements, such as buttons, keys, triggers, touchscreens, and/or trackpads.

At a step 400 one or more audio inputs are captured by a microphone associated with the controller. These audio inputs may include speech by the user of the controller, for example, although it is considered that any audio may be appropriate.

At a step 410 one or more inputs from a user to the controller are detected. This detection may be performed in any suitable manner; in a first example this may be performed through an audio detection in which the sound of an element being operated by a user to provide an input is detected. A second example is that of an analysis of signals output (or at least generated for output) by the controller in response to an input by a user so as to determine which inputs have been provided at a particular time.

A step 420 comprises the generation of a response to the detected input in dependence upon the input and at least a distance between an element associated with the input and the microphone. For instance, based upon the detection of a particular input the expected sound at the microphone due to that input may be identified—as discussed above, the audio impact of the providing of the input is also dependent upon at least a distance between the element associated with the input and the microphone as attenuation or conduction through a controller may be relevant factors. The response that is generated is dependent upon the desired method of modifying the audio data.

A step 430 comprises outputting the response generated in step 420. In some embodiments, this may comprise providing an audio signal to a speaker for output so as to mitigate the audio impact of the audio associated with the detected inputs from the user. In such a case the response may comprise an audio signal that is the inverse of the audio associated with the detected input, with one or more further modifications to account for the relative locations of the element associated with the input, the microphone, and/or the speaker for outputting the response.

Alternatively, or in addition, the outputting of the response may comprise providing information for modifying the captured audio directly so as to modify the captured audio to reduce the audio impact of the audio associated with the detected inputs from the user. For instance, a digital signal that is the inverse of the audio associated with the detected input may be generated or information about time, magnitude, and/or frequency that enables a more specific removal of the unwanted audio (that corresponding to the input by the user) from the captured audio.

Figure 5:
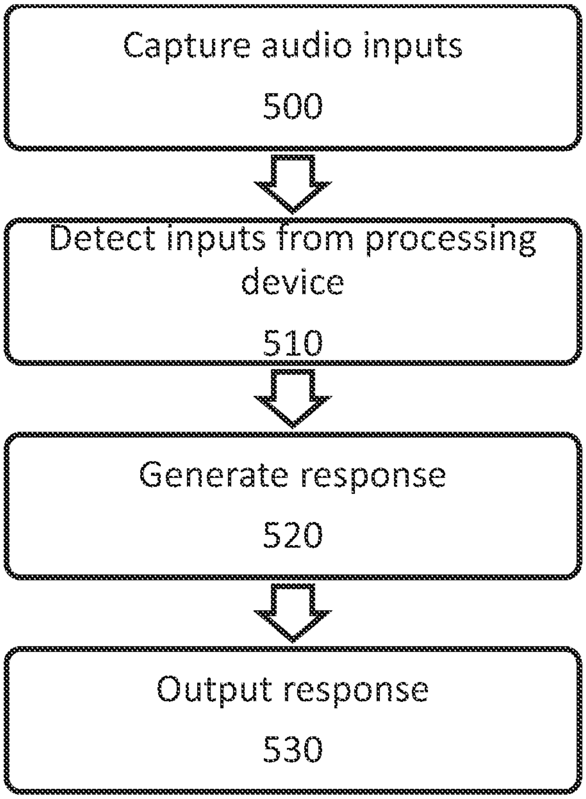
FIG. 5 schematically illustrates a method for generating a response to a detected input by a processing device.

FIG. 5 schematically illustrates a method for generating a response to a detected input by a processing device, the response being used to modify captured audio.

At a step 500 one or more audio inputs are captured by a microphone associated with the controller. These audio inputs may include speech by the user of the controller, for example, although it is considered that any audio may be appropriate.

At a step 510 one or more inputs from a processing device to the controller are detected. These inputs may comprise audio to be output by a speaker associated with the controller (such as sound effects corresponding to an in-game event) or signals controlling an operation of the controller (such as haptic feedback signals). These can be detected via a microphone or an analysis of data received from the processing device, similar to the detection discussed with reference to step 410 above.

A step 520 comprises the generation of a response to the detected input in dependence upon the input and at least a distance between an element (such as a speaker or haptic feedback element) associated with the corresponding output (that is, the output that is generated based upon the detected input) and the microphone. For instance, based upon the detection of a particular input the expected sound at the microphone due to that input may be identified—as discussed above, the audio impact of the providing of the input is also dependent upon at least a distance between the element associated with the input and the microphone as attenuation or conduction through a controller may be relevant factors. The response that is generated is dependent upon the desired method of modifying the audio data.

A step 530 comprises outputting the response generated in step 520. In some embodiments, this may comprise providing an audio signal to a speaker for output so as to mitigate the audio impact of the audio associated with the detected inputs from the processing device. In such a case the response may comprise an audio signal that is the inverse of the audio associated with the detected input, with one or more further modifications to account for the relative locations of the element associated with the input, the microphone, and/or the speaker for outputting the response.

Alternatively, or in addition, the outputting of the response may comprise providing information for modifying the captured audio directly so as to modify the captured audio to reduce the audio impact of the audio associated with the detected inputs from the processing device. For instance, a digital signal that is the inverse of the audio associated with the detected input may be generated or information about time, magnitude, and/or frequency that enables a more specific removal of the unwanted audio (that corresponding to the input by the processing device) from the captured audio.

In some embodiments, these inputs by the processing device can be determined in advance by the processing device; for instance, during a scripted scene within a game. In such cases, the response may be generated so as to be output alongside the input itself. Similarly, the processing device may be configured (for example, in dependence upon identification of a controller being used) to generate the response automatically at the time of generating the input. For example, a processing device may be configured to generate a haptic feedback signal and a response to mitigate the audio impact of the haptic feedback at the same time (or otherwise as a part of the same process). This can be advantageous in reducing the latency of the response generation process; particularly in the case in which the processing device implements the response.

While the discussion above has been primarily concerned with controllers with integrated microphones for capturing audio (such as a user's commentary), it is also considered that the microphone may be located in a separate device such as a headset. In such cases the distance between the controller (that is, the hardware generating audio from inputs) and the microphone may not be fixed. In such cases, the locations of the respective devices can be tracked and a determination of the variation on the audio impact can be determined accordingly—for instance, the magnitude of the audio impact may be reduced with increasing distance between the devices. Any suitable tracking method may be performed—for instance, camera-based tracking of both the controller and the headset (or the user's head, from which the location of a head-mounted microphone may be derived) can be performed.

Figure 6:
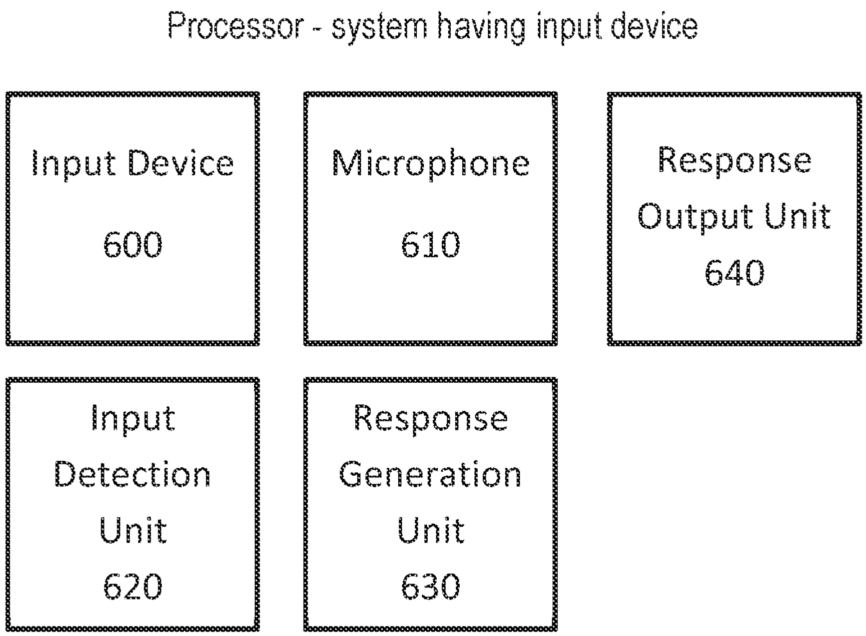
FIG. 6 schematically illustrates a system for implementing one or more embodiments of the present disclosure.

FIG. 6 schematically illustrates a system for implementing one or more embodiments of the present disclosure. This system comprises an input device 600, a microphone 610, an input detection unit 620, and a response generation unit 630. The input detection unit 620 and response generation unit 630 may be implemented using central processing units or the like located at one or more devices (such as the input device 600, an associated processing device, and/or a server). Further functional units may also be provided but are not shown for conciseness; for instance, storage means (such as a hard drive) for storing input device 600 parameters may be provided, and a processing unit for performing audio processing on the audio captured by the microphone 610 may be provided.

The input device 600 comprises one or more elements operable by a user to generate inputs to a processing device; this processing device may be an associated games console or the like, or a server in a cloud-based arrangement. The elements may comprise one or more of buttons, keys, switches, analogue sticks, touch inputs, and/or triggers, for example. In some embodiments the input device 600 may be formed as a game controller, keyboard, or touch screen device; discussion of the controller elsewhere in this document may therefore be considered to be applicable to embodiments of the input device 600 where appropriate. Alternatively, or in addition, the input device 600 may be provided in an integrated fashion with one or more other devices; for instance, a device comprising the input device 600, the processing device, and a display device operable to display an output of the processing device may be provided. Examples of this as discussed above include laptops, portable games consoles, and mobile phones.

The microphone 610 is operable to capture one or more audio inputs. In some embodiments, the microphone is provided as a part of the input device 600; alternatively, or in addition, the microphone 610 may be provided with separate hardware such as a headset worn by a user, integrated with a processing device, or as a standalone unit.

The input detection unit 620 is operable to detect one or more inputs to the input device 600 by the user. In some embodiments, the input detection unit 620 is operable to detect inputs using captured audio as discussed with reference to step 410 of FIG. 4. This captured audio may be audio captured by the microphone 610, or it may be audio captured using an alternative microphone. Alternatively, or in addition, the input detection unit 620 is operable to detect inputs in dependence upon control signals generated by the input device 600 in response to the user input.

The response generation unit 630 is operable to generate a response to the detected input in dependence upon the input and at least a distance between an element associated with the input and the microphone. The response generation unit 630 may be implemented by a processing unit located at either (or both of) the input device 600 and the associated processing device (or the like). This response may be a signal that is the inverse of the audio associated with the detected input, with one or more additional modifications where appropriate to account for additional acoustic effects.

In some embodiments the response generation unit 630 is operable to generate an audio response for output by a speaker associated with the input device 600. Alternatively, or in addition, the response generation unit 630 may be operable to generate a response for output to an audio processing unit operable to modify audio inputs captured by the microphone 610. Examples of this response generation are discussed above with reference to steps 420 and 430 of FIG. 4.

The response generation unit 630 may be operable to generate a response in dependence upon one or more physical properties of the input device 600, rather than only the distance between the element associated with the input and the microphone 610 (and/or other factors). Examples of the physical properties include one or more of the size, shape, structure, material, and/or sound conductivity of the input device 600; these properties may be used to infer or calculate the difference between audio emitted by an element during the input process and the audio detected by the microphone

610, as these properties influence the audio propagation through the input device 600. Such properties may be relevant even if the microphone 610 is not integrated with the input device 600, as the audio generated by the user input may still be affected by these properties. This may be particularly true of rear triggers on a controller, for example, when the user wears a headset microphone; the sound from the triggers still propagates through the controller to reach the microphone.

An alternative or additional option may be that of the response generation unit 630 being operable to generate a response in dependence upon one or more operational parameters of the input device 600, including parameters indicating how the input device 600 is held by the user. For example, pressure sensors on the input device 600 may be used to infer the force with which the input device 600 is held or the size of the user's hands. Other operational parameters may include information about a surface upon which the input device 600 is placed during use. Operational parameters may be determined using images of the arrangement or audio cues (for instance, determining a difference between expected and received audio from operation of the input device 600 due to these parameters), and can be used to modify the expected audio impact upon the audio captured by the microphone 610.

In some embodiments the response generation unit 630 may be configured to generate a response using one or more transfer functions defined for the input device and/or one or more elements of the input device (such as individual buttons). These may be generated based upon information about the structure and arrangement of elements within a controller, for instance, or may be generated based upon an analysis of the propagation of sound throughout the controller. For example, this latter generation may be performed by providing a standardised sound and comparing the response measured at the microphone with information about the sound; the standardised sound may be pre-recorded audio, for example, or may be derived based upon information about the operation of a button (for instance, some buttons can detect how hard they are pressed, which can be used to determine an expected sound of pressing the button). Based upon this comparison, information such as a time delay, attenuation, and/or changes in frequency or frequency profile can be identified.

In some cases, these transfer functions may also be defined in dependence upon information about the user's grip on the controller or other information about the location of the input device (such as if it is placed upon a hard surface or soft surface) that can have an effect on the propagation of sound throughout the input device. This can be determined based upon measurements of the grip (for instance, using pressure sensors on the input device or inferring a strong grip through hard button presses or the like) and using this to predict or estimate a change in the sound propagation, for instance. Similarly, spatial tracking of the input device can be used to determine if the input device is resting on a particular surface in the environment (with identification of the surface providing information about its hardness or other properties).

While discussed above in the context of determining what audio would be picked up by the microphone, in some cases it may be considered useful to instead (or additionally) determine transfer functions that represent the audio that would be heard by the user when operating the input device. Such a transfer function would be expected to be dependent upon a relative position of the input device and the user's head (or more specifically, ears). Further consideration may also be made for attenuation or the like due to the user wearing headphones or the like. These transfer functions may be defined for each (or at least a selection of) input element, groups of input elements (such as all shoulder buttons on a controller), or it may be considered sufficient to define a transfer function for the input device itself (this may be used in conjunction with transfer functions for input elements, in some embodiments).

In such embodiments, an optional transfer function identification unit may be provided which is operable to identify a transfer function in dependence upon at least one property of the input device and a distance between an element associated with the corresponding input and the microphone. Alternatively, a pre-existing transfer function may be selected in dependence upon an identified input provided to the processing device from the input device—for instance, selecting a transfer function associated with a particular button or input key that has been operated by a user. In this case, the response generation unit may be operable to generate a response to the detected input in dependence upon the input and the identified transfer function without explicitly utilising the distance between an element associated with the input and the microphone.

The response output unit 640 is operable to output the response generated by the response generation unit 630. The response output unit 640 may be configured as appropriate for a particular embodiment; for example, in some cases the response output unit 640 may be implemented as a processing unit and a speaker for generating audio outputs as responses. Alternatively, the response output unit 640 may be implemented as a processor that provides a signal to an audio processing unit for modifying audio captured by the microphone 610. In some embodiments, the response output unit 640 may comprise each of these features so as to be able to output either type of response as appropriate. For instance, in some embodiments it may be considered that an audio output is more appropriate for some inputs while audio processing is more appropriate for others. This may be determined on a per-input basis as appropriate for a particular input device 600, for instance.

The arrangement of FIG. 6 is an example of a processor (for example, a GPU and/or CPU located in a games console or any other computing device) for use with a system comprising an input device comprising one or more elements operable by a user to generate inputs to a processing device and a microphone operable to capture one or more audio inputs. The processor is operable to:

- detect one or more inputs to the input device by the user; and
- generate a response to the detected input in dependence upon the input and at least a distance between an element associated with the input and the microphone.

Figure 7:
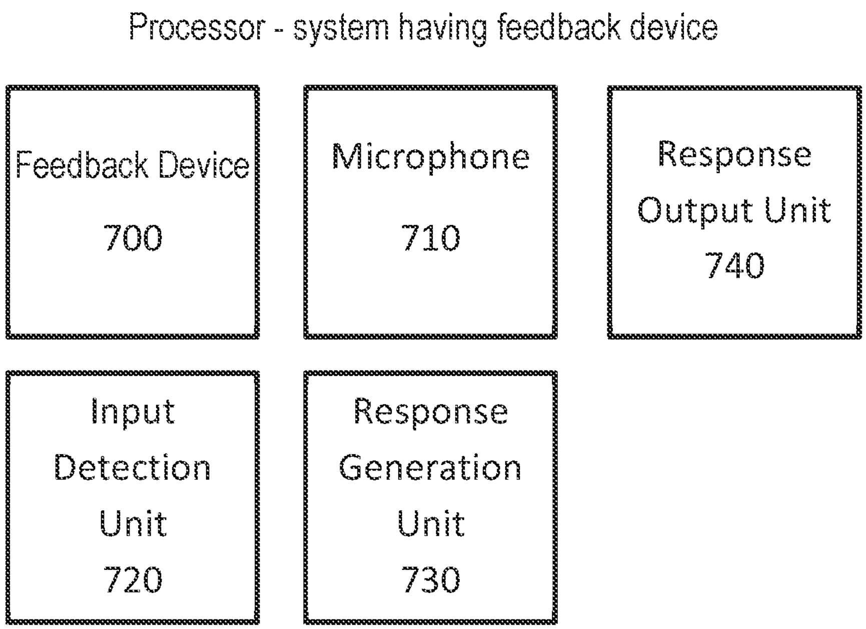
FIG. 7 schematically illustrates a system for implementing one or more embodiments of the present disclosure.

FIG. 7 schematically illustrates a system for implementing one or more embodiments of the present disclosure. This system comprises a feedback device 700, a microphone 710, an input detection unit 720, and a response generation unit 730. The input detection unit 720 and response generation unit 730 may be implemented using central processing units or the like located at one or more devices (such as the feedback device 700, an associated processing device, and/or a server). Further functional units may also be provided but are not shown for conciseness; for instance, storage means (such as a hard drive) for storing feedback device 700 parameters may be provided, and a processing unit for performing audio processing on the audio captured by the microphone 710 may be provided.

The feedback device 700 comprises one or more elements operable to generate an output in response to an input from a processing device; examples of these outputs include audio outputs (via a speaker associated with the input device 700) and haptic feedback via haptic feedback units (such as rumble generators). In accordance with the discussion above, the feedback device 700 may be embodied as a games controller or the like; however it is not required that the feedback device 700 is configured so as to enable user inputs. In other words, the only requirement is that the feedback device 700 is operable to generate an output in response to an input from a processing device. Examples of suitable feedback devices include those which provide haptic feedback via a rumble motor or the like—the feedback device 700 may therefore be embodied as a head-mountable display which provides haptic feedback, for example, or another wearable device (such as a vest that is able to simulate impacts, or a wristband that simulates weight using torque generation) that provides outputs with limited user input functionality.

The microphone 710 is operable to capture one or more audio inputs. In some embodiments, the microphone is provided as a part of the feedback device 700; alternatively, or in addition, the microphone 710 may be provided with separate hardware such as a headset worn by a user, integrated with a processing device, or as a standalone unit.

The input detection unit 720 is operable to detect one or more inputs to the feedback device 700 from the processing device. In some embodiments the input detection unit 720 is operable to detect inputs using captured audio indicating a corresponding output; that is, an input can be detected from captured audio that comprises audio of an output that is generated in response to the input. For instance, if audio comprises the sound of a rumble then it can be inferred that a haptic feedback signal was provided to the feedback device 700.

Alternatively, or in addition, the input detection unit 720 may be operable to detect inputs in dependence upon control signals in the input provided to the feedback device 700 by the processing device. Such a detection may comprise the analysis of incoming signals to the feedback device 700 to determine which output is instructed; alternatively, or in addition, this may comprise an analysis of the control signals as a part of the generation process.

The response generation unit 730 is operable to generate a response to the detected input in dependence upon the input and at least a distance between an element associated with the corresponding output and the microphone. The response generation unit 730 may be implemented by a processing unit located at either (or both of) the feedback device 700 and the associated processing device (or the like). This response may be a signal that is the inverse of the expected output associated with the detected input, with one or more additional modifications where appropriate to account for additional acoustic effects.

In some embodiments the response generation unit 730 is operable to generate an audio response for output by a speaker associated with the feedback device 700. Alternatively, or in addition, the response generation unit 730 may be operable to generate a response for output to an audio processing unit operable to modify audio inputs captured by the microphone 710. Examples of this response generation are discussed above with reference to steps 520 and 530 of FIG. 5.

The response generation unit 730 may be operable to generate a response in dependence upon one or more physical properties of the feedback device 700, rather than only the distance between the element associated with the input and the microphone 710 (and/or other factors). Examples of the physical properties include one or more of the size, shape, structure, material, and/or sound conductivity of the feedback device 700; these properties may be used to infer or calculate the difference between audio emitted by an element during the input process and the audio detected by the microphone 710, as these properties influence the audio propagation through the feedback device 700. Such properties may be relevant even if the microphone 710 is not integrated with the feedback device 700, as the audio generated by the user input may still be affected by these properties. This may be particularly true of rear triggers on a controller, for example, when the user wears a headset microphone; the sound from the triggers still propagates through the controller to reach the microphone.

An alternative or additional option may be that of the response generation unit 730 being operable to generate a response in dependence upon one or more operational parameters of the feedback device 700, including parameters indicating how the feedback device 700 is held by the user. For example, pressure sensors on the feedback device 700 may be used to infer the force with which the feedback device 700 is held or the size of the user's hands. Other operational parameters may include information about a surface upon which the feedback device 700 is placed during use. Operational parameters may be determined using images of the arrangement or audio cues (for instance, determining a difference between expected and received audio from operation of the feedback device 700 due to these parameters), and can be used to modify the expected audio impact upon the audio captured by the microphone 710.

In some embodiments the response generation unit 730 may be configured to generate a response using one or more transfer functions defined for the feedback device 700 and/or one or more output elements of the feedback device 700 (such as particular haptic feedback elements). These may be generated based upon information about the structure and arrangement of elements within a controller, for instance, or may be generated based upon an analysis of the propagation of sound throughout the controller. For example, this latter generation may be performed by providing a standardised sound and comparing the response measured at the microphone with information about the sound; the standardised sound may be haptic feedback with a known duration, frequency, intensity, and/or timing, for example. Based upon this comparison, information such as a time delay, attenuation, and/or changes in frequency or frequency profile can be identified.

In some cases, these transfer functions may also be defined in dependence upon information about the user's grip on the controller or other information about the location of the feedback device (such as if it is placed upon a hard surface or soft surface) that can have an effect on the propagation of sound throughout the feedback device. This can be determined based upon measurements of the grip (for instance, using pressure sensors on the input device or inferring a strong grip through hard button presses or the like) and using this to predict or estimate a change in the sound propagation, for instance. Similarly, spatial tracking of the feedback device can be used to determine if the feedback device is resting on a particular surface in the environment (with identification of the surface providing information about its hardness or other properties).

While discussed above in the context of determining what audio would be picked up by the microphone, in some cases it may be considered useful to instead (or additionally)

determine transfer functions that represent the audio that would be heard by the user when operating the feedback device. Such a transfer function would be expected to be dependent upon a relative position of the feedback device and the user's head (or more specifically, ears). Further consideration may also be made for attenuation or the like due to the user wearing headphones or the like. These transfer functions may be defined for each (or at least a selection of) output element, groups of output elements (such as all vibrating elements on a controller), or it may be considered sufficient to define a transfer function for the feedback device itself (this may be used in conjunction with transfer functions for output elements, in some embodiments). In some cases, it may be possible to use transfer functions and/or other information about the output to determine the overall audio impact upon the microphone or user. For instance, in some cases it may be considered that the outputs generated by respective output elements of the feedback device (such as a number of respective vibrations generated by motors in a controller) generate interference with one another. This interference can be constructive (thereby increasing the overall audio impact), destructive (reducing the overall audio impact, or in some cases eliminating it entirely), or a combination of the two such that some parts of the output (such as particular vibration frequencies) are enhanced while others are diminished. It is therefore considered that if the estimated overall audio impact of the output elements for particular respective outputs falls below a threshold value, no response need be generated.

In such embodiments, an optional transfer function identification unit may be provided which is operable to identify a transfer function in dependence upon at least one property of the feedback device and a distance between an element associated with the corresponding output and the microphone.

Alternatively, a pre-existing transfer function may be selected in dependence upon an identified input provided to the feedback device from the processing device—for instance, selecting a transfer function associated with a particular vibrating element. In this case, the response generation unit may be operable to generate a response to the detected input in dependence upon the input and the identified transfer function without explicitly utilising the distance between an element associated with the corresponding output and the microphone.

In some embodiments the input detection unit 720 is provided at the processing device and is operable to detect inputs before they are provided to the feedback device 700; in such cases the response (generated by the response generation unit 730) to the detected input may be provided to the feedback device 700 in association with the detected input.

The response output unit 740 is operable to output the response generated by the response generation unit 730. The response output unit 740 may be configured as appropriate for a particular embodiment; for example, in some cases the response output unit 740 may be implemented as a processing unit and a speaker for generating audio outputs as responses. Alternatively, the response output unit 740 may be implemented as a processor that provides a signal to an audio processing unit for modifying audio captured by the microphone 610. In some embodiments, the response output unit 740 may comprise each of these features so as to be able to output either type of response as appropriate. For instance, in some embodiments it may be considered that an audio output is more appropriate for some inputs while audio processing is more appropriate for others. This may be determined on a per-input basis as appropriate for a particular feedback device 700, for instance.

The arrangement of FIG. 7 is an example of a processor (for example, a GPU and/or CPU located in a games console or any other computing device) for use with a system comprising a feedback device comprising one or more elements operable to generate an output in response to an input from a processing device, and a microphone operable to capture one or more audio inputs. The processor is operable to:

detect one or more inputs to the feedback device from the processing device; and generate a response to the detected input in dependence upon the input and at least a distance between an element associated with the corresponding output and the microphone.

Figure 8:
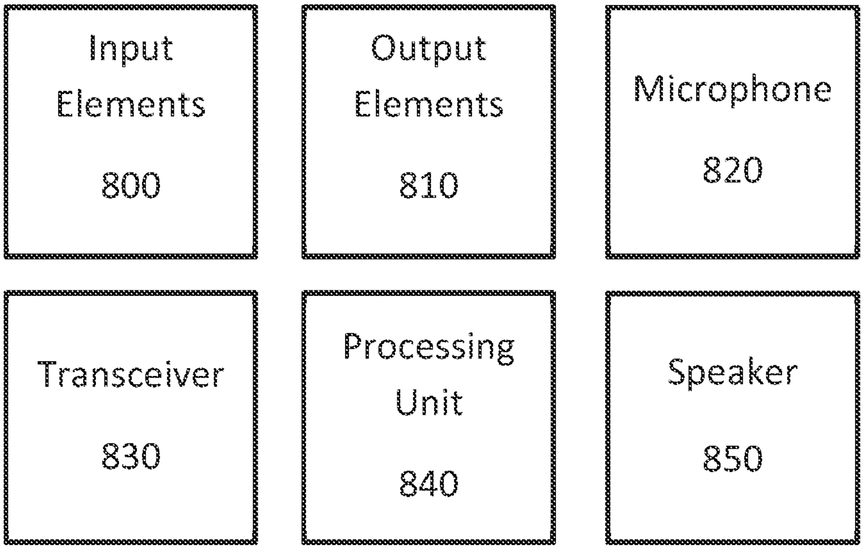
FIG. 8 schematically illustrates an input device according to one or more embodiments of this disclosure.

FIG. 8 schematically illustrates an input device according to one or more embodiments of this disclosure; the input device of FIG. 8 may function as the controller 200 of FIG. 2, for example. The input device 600 and feedback device 700 of FIGS. 6 and 7 may be implemented in accordance with the example of FIG. 8, with any one or more of the elements being considered optional as appropriate; for instance, the output elements 810 may be omitted if no haptic feedback or audio output is desired and/or the processing unit 840 may be omitted if the processing functions are to be performed by an associated processing device such as a games console. Similarly, the input elements 800 may be omitted in embodiments in which no user input is envisaged (that is, in the case of a feedback-only device).

The input elements 800 comprise any features that can be operated by a user in order to provide an input to a process such as a computer program or a game. Examples of suitable input elements include buttons, keys, switches, analogue sticks, touch inputs, and/or triggers. Additional (or alternative) input elements may be provided to enable additional functionality; for instance, trackable indicators (such as coloured lights), inside-out tracking cameras, and/or hardware motion detectors such as accelerometers and gyroscopes may be provided to enable a user to provide motion inputs. Similarly, a microphone may be provided as an input element to enable voice commands to be provided by a user.

The output elements 810 comprise any suitable elements for providing feedback to the user in dependence upon signals generated by a processing device. Examples of suitable elements include haptic feedback elements, such as vibration or rumble units, and speakers operable to provide audio feedback to a user.

The microphone 820 may include one or more microphones that are associated with the input device. A single microphone that may be provided that captures audio for output, such as voice communication by a user. This same microphone may be used for detection of inputs/outputs as discussed with reference to FIGS. 4 and 5. In a number of embodiments multiple microphones may be provided. For instance, multiple microphones can be provided for capturing audio for output so as to increase the accuracy of the localisation of the sound source. Alternatively, or in addition, further microphones can be provided that are for the sole purpose of detecting inputs/outputs; these microphones may be of a lower quality than those for capturing audio for output (such as operating over a reduced frequency range, or generating a noisier signal) where appropriate.

The transceiver 830 (or alternatively, a separate transmitter and receiver) can be provided to facilitate communications between the input device and an external processing device. Such a feature may be omitted when the input device is integrated with the processing device (such as for a laptop or handheld games console). This unit 830 is operable to transmit and receive communications via a wired or wireless communication protocol to enable the transfer of inputs and outputs between the input device and an associated processing device.

The processing unit 840 is provided so as to be able to perform any suitable processing at the input device; this unit 840 may be used to perform the input detection and/or response generation process in some embodiments, for example. This processing unit 840 may also be operable to perform audio modification processing where appropriate; for example, to apply a response to generated audio. Such a unit 840 (or at least a selection of its functionality) may instead be implemented by an associated processing device in some embodiments.

The speaker 850 may comprise one or more speakers operable to provide audio outputs. In some embodiments a single speaker may be provided that provides audio (such as game audio or voice communication audio) to a user, and this speaker may be repurposed as desired to generate audio signals for mitigating the audio impact of inputs by the user or the processing device. Alternatively, multiple speakers may be provided for the purpose of providing surround sound and/or dedicated speakers for generating the mitigating audio output. As with the microphone 820 discussed above, a lower-quality speaker may be provided where appropriate; for example, one having a lower frequency range or a lower quality sound output for the mitigating audio output.

While only the use of a single input device in a system has been discussed above, it is also considered that arrangements in which multiple such devices can be provided may be suitable for such processing. Each of the input devices may be subject to further processing so as to mitigate the audio impact of sounds generated by one or more of the other input devices in the system. This may enable the advantages of the present disclosure to be extended effectively to multiplayer arrangements, or arrangements in which a single user is provided with multiple input devices.

In such arrangements it is considered that operation information for each of the input devices can be generated independently (such as information regarding inputs by a user and/or inputs from the processing device to the respective input devices) and shared amongst the input devices in the case in which the audio impact mitigation processing is performed by each input device. Alternatively, or in addition, processing may be performed by a common processing device (such as a games console with which each of the input devices is associated) so as to reduce the amount of information needing to be transmitted. Further information that may be useful is that of the distance between each of the input devices; this can be acquired through camera-based tracking solutions or a proximity detection, for example. Such processing may be implemented on a threshold basis, such that input devices more than a threshold distance from one another may be considered to have a negligible (or no) impact on one another. The threshold distance may be determined for individual inputs/outputs as appropriate, in accordance with the fact that each may be associated with a different volume or audio impact.

It is further noted that the teachings of the present disclosure do not require a microphone to be capturing audio in order to provide advantages to a user. It is also considered that such noise cancellation (or mitigation) may be desirable for a user's own benefit—in other words, audio may be output by the audio device so as to mitigate the impact of inputs/outputs where appropriate. For instance, the sound associated with haptic feedback may be mitigated using techniques described above, which can enable a user to benefit from the advantages of the feedback without experiencing such significant disruption from the associated sounds.

As discussed above, the audio cancellation processes may utilise a transfer function in order to more precisely identify the audio impact of the operation of a particular input or output on audio recorded by a microphone. A transfer function may be used to represent the difference between the initial sound (such as a button press or rumble) and the sound that would be captured by a particular microphone. For instance, a vibration at a particular frequency may cause a secondary vibration at a different frequency within the input device due to resonance of the shell of the input device, or the volume may vary due to distance between the input/output element (such as a button or haptic feedback element).

The use of a transfer function which represents such considerations can therefore enable an improved processing of the captured audio to remove or mitigate the audio impact, for example, or a more effective generation of an inverse haptic signal to mitigate the audio impact of a haptic feedback element. Therefore, while such a transfer function is not considered to be essential, in a number of embodiments of the present disclosure it may nevertheless be considered desirable.

Figure 9:
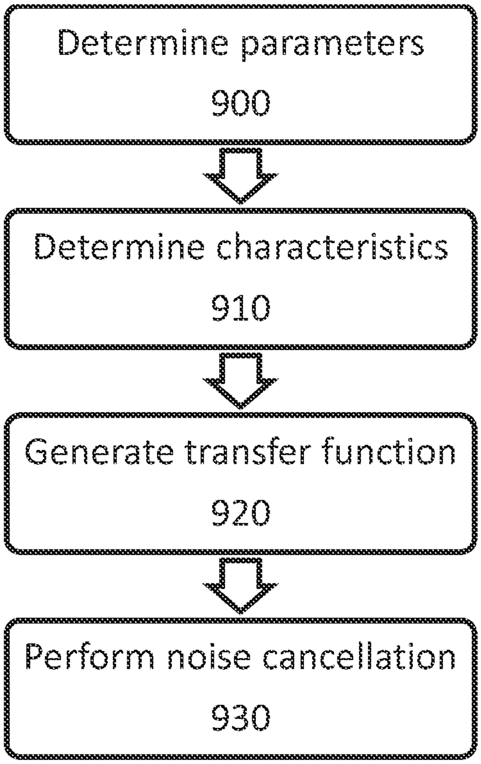
FIG. 9 schematically illustrates a method for generating a transfer function.

FIG. 9 schematically illustrates a method for generating such a transfer function. This is discussed in the context of a generic input device; as discussed above this may be a controller for use with a games console, a keyboard, an integrated input device (such as portable games console or laptop input devices), or any other device for providing inputs to a processing device to control the operation of that device. This input device may correspond to either of the input device and feedback device discussed above, and may comprise both input and output elements so as to function as both of these. The method described below is exemplary, rather than limiting, and as such it is considered that any suitable method for generating a transfer function may be appropriate in embodiments of the present disclosure.

For instance, one alternative method for generating a transfer function (as discussed above) is that of providing standardised stimuli (such as predefined haptic feedback, or button presses of a known pressure/duration) and determining the difference between the audio impact of a stimulus at the microphone and the expected (known) audio impact at the source of the stimulus. This is effectively a comparison of the output (generated) audio and the captured audio. While effective, this may be considered inefficient as it may be necessary to perform a vast number of measurements in order to provide a satisfactory set of transfer functions (or a single transfer function) that can represent a sufficiently broad range of operational and structural parameters.

Turning to the method of FIG. 9, a step 900 comprises determining one or more parameters of the input device, wherein the parameters include a location of a microphone associated with the input device and a location of one or more respective input and/or output elements associated with the input device. These parameters are considered to be properties of the input device and its constituent elements, as well as information about how the input device is being used, as these as factors that can modify the transmission of audio and vibrations throughout the input device.

Examples of other parameters include the location of the input device in the environment, the motion of the input device, the identification of a surface upon which the input device is placed, whether an input device is held by a user (and if so, which hands are used and how strongly the user grips the input device), the shape and/or structure of the input device, the mass of the device, operation parameters of inputs/output (such as how a particular button works), and switch type (in other words, how a button is implemented). Any modifications to a controller may also be considered (functional or decorative, such as replacing buttons with alternatives or adding elements to modify the appearance of the device), as well as the attachment of peripherals (such as a plugged-in keyboard or headset) which may change how the audio/vibrations are transmitted throughout the input device.

The parameters may be determined in any suitable manner. For instance, while some parameters may be input by a user, others may be available from a database of information about particular input devices. Alternatively, or in addition, some parameters may be identified (such as respective button locations, or the location of the input device) based upon images captured of the input device. In some cases, an identification of the materials used to construct the input device may also be considered based upon any suitable techniques, such as from images, audio properties, or a determination of the density of the input device. Data from any suitable sensors, such as cameras, microphones, and inertial sensors, may be used to determine parameters.

In some cases, rather than a direct detection it is suitable to infer parameters of the input device and/or its use. For instance, rather than explicitly determining a surface upon which the input device is resting, it may be sufficient to determine that the device is unmoving and in a particular resting orientation (such as flat, or stood on end). This determination can be considered indicative of the input device being on a hard surface, as if it were held it would not be unmoving and if it were on a softer surface then it could be expected that the input device was at a different orientation (such as at a slant) as it may sink into the surface in an uneven manner. Similarly, it may be possible to determine which hand (or hands) a user is using to operate the input device based upon patterns in the detected motion of the input device—it is not considered necessary to analyse images to identify the user's hands on the input device, or to require a user to provide an indication of how they are holding the input device.

A step 910 comprises determining one or more characteristics of audio transmission between respective input and/or output elements and the microphone, wherein the characteristics include one or more of an attenuation, resonance, and/or change in frequency profile of audio associated with the respective input and/or output element. Audio transmission here may be considered to refer to audio or vibration from any input and/or output element—including both sounds of operating buttons or the like and the provision of haptic feedback through vibrating elements, for example. This determination may be performed by modelling the propagation of audio/vibrations throughout the input device, for instance; a model may be generated based upon the specific parameters as determined in step 900, or an existing model may be adapted in accordance with the parameters determined in step 900.

In some embodiments, this step may comprise the determination of the impact of one or more parameters upon audio transmission rather than a complete calculation of audio transmission characteristics. For instance, an attenuation factor may be calculated for a sound associated with a particular input or output element, or the frequency of a resonant output may be determined. Such information can be used to adapt an existing transfer function or as inputs for the generation of a new transfer function.

A step 920 comprises generating a transfer function (or a plurality of transfer functions) in dependence upon the determined audio characteristics. As indicated above, this may include the generation of an entirely new transfer function or the modification of an existing transfer function. For instance, a 'base' transfer function for the input device that is defined by a manufacturer of the input device may be modified in dependence upon information about how the input device is being held (an example of a parameter) and the effect of this upon the audio transmission (an example of a characteristic). Once generated, the transfer function may be stored for future use; alternatively, a new transfer function may be generated with any degree of regularity (such as each play session, after a predetermined amount of time, after an above-threshold change in one or more parameters) as is considered appropriate for a given implementation.

Transfer functions may be defined in any suitable combination for a given input device. In some embodiments, a single transfer function may be defined for the input device as a whole which indicates general properties of the audio transmission characteristics—this may be particularly suitable for input devices with a simple structure and an arrangement of inputs that means little variation in the audio impact generated during use. Alternatively, transfer functions may be defined for each microphone associated with the input device and/or for each input/output element associated with the input device; in this manner, a separate transfer function could be identified for each microphone/input or output pair identified at the input device.

An optional step 930 comprises performing a noise cancellation process for audio corresponding to one or more inputs and/or outputs of the input device in dependence upon the generated transfer function; such a step is optional, as the generation of the transfer function or functions in step 920 may be performed as part of a calibration process or the like that seeks to establish a number of transfer functions for use before they are required. This noise cancellation process may be performed in accordance with either of the methods described with reference to FIGS. 4 and 5, for example, in which the response is generated in dependence upon the transfer function(s) generated in step 920. In other words, the noise cancellation process comprises the generation of output audio and/or the modification of captured audio comprising audio corresponding to one or more inputs and/or outputs of the input device.

In the case that multiple transfer functions are associated with an input device, it is considered that an appropriate transfer function may be selected in dependence upon the input or output that is identified as corresponding to a particular sound. For instance, the operation of a particular button of the input device can be identified and a corresponding transfer function for that button may be selected.

Figure 10:
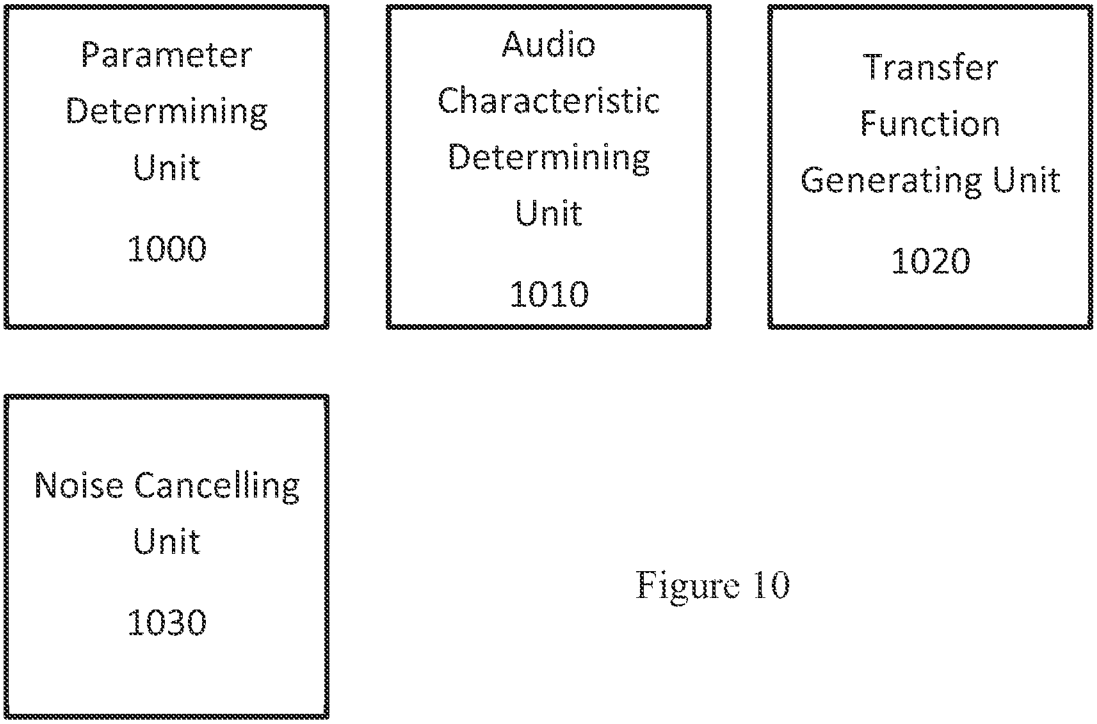
FIG. 10 schematically illustrates a system for generating a transfer function.

FIG. 10 schematically illustrates a system for generating a transfer function indicating audio transmission characteristics of an input device associated with a processing device. The input device may include any number of input and/or output elements; the input elements may include one or more buttons, keys, triggers, joysticks, and/or touchpads operable by a user of the input device, while the output elements may include one or more haptic feedback units and/or speakers configured to provide an output to a user of the input device.

The system includes a parameter determining unit 1000, an audio characteristic determining unit 1010, a transfer function generating unit 1020, and a noise cancelling unit 1030. This arrangement, which can be implemented using any suitable processing units (such as CPUs and/or GPUs) associated with any suitable device or devices; for example, a processor located at a games console with which the input device is associated may be used to implement the functionality described below. The system of FIG. 10 is configured to perform a method in accordance with that discussed above with reference to FIG. 9.

The parameter determining unit 1000 is configured to determine one or more parameters of the input device, wherein the parameters include a location of a microphone associated with the input device and a location of one or more respective input and/or output elements associated with the input device. The parameter determining unit 1000 may be configured to determine the properties of audio associated with each of the input and/or output elements for which a location is determined; for instance, this may include determining a sound or range of sounds associated with the operation of a particular input (such as the sound of pressing a button) or the characteristic frequencies or frequency ranges/profiles of a particular output (such as the frequencies associated with a haptic feedback element).

In some embodiments, the parameter determining unit 1000 is configured to determine parameters based upon a model of the input device, images captured of that input device, and/or information captured during operation of the input device by a user. A model of the input device may include any suitable information about the device—for instance, a shape, size, arrangement of elements, material information, weight, and any other information that may be considered relevant to audio generated by the device or its operation and how that audio is propagated throughout the input device. Images may be used to derive such information (for instance, by using images to determine a size and material used for the input device).

Information captured during operation of the input device by a user may include audio captured by the microphone associated with the input device (or another microphone), which can be compared to expected audio so as to derive one or more parameters associated with the audio propagation. Additional information may include a strength of grip, how the user holds an input device (such as number of hands, and how they are arranged on the input device), the motion of the input device, and information about any other factors that may affect the propagation of audio through the input device.

The audio characteristic determining unit 1010 is configured to determine one or more characteristics of audio transmission between respective input and/or output elements and the microphone, wherein the characteristics include one or more of an attenuation, resonance, and/or change in frequency profile of audio associated with the respective input and/or output element. The audio characteristic determining unit 1010 may be configured to determine parameters based upon a model of the input device and/or information captured during operation of the input device by a user; this may be the same model and/or information captured as described above with reference to the parameter determining unit 1010.

In embodiments in which the parameter determining unit 1000 is configured to determine the location and/or motion of the input device as a parameter, it is considered that the audio characteristic determining unit 1010 may be configured to determine one or more characteristics of audio transmission in dependence upon the location and/or motion of the input device. Similarly, in embodiments in which the parameter determining unit 1000 is configured to determine how the input device is held by a user of the device as a parameter, it is considered that the audio characteristic determining unit 1010 may be configured to determine one or more characteristics of audio transmission in dependence upon how the input device is held by the user.

The transfer function generating unit 1020 is configured to generate a transfer function in dependence upon the determined audio characteristics. In some embodiments, the transfer function generating unit 1020 is configured to generate respective transfer functions for each microphone associated with the input device. Alternatively, or in addition, the transfer function generating unit 1020 may be configured to generate respective transfer functions for each of a plurality of the input and/or output elements associated with the input device.

The noise cancelling unit 1030 is configured to perform a noise cancellation process for audio corresponding to one or more inputs and/or outputs of the input device in dependence upon the generated transfer function. This noise cancellation may be performed in accordance with any of the techniques described above; for instance, those discussed with reference to FIGS. 4 and 5. The noise cancellation process may comprise the generation of output audio (or vibration) and/or the modification of captured audio comprising audio corresponding to one or more inputs and/or outputs of the input device. These respectively represent the output of an inverse signal to mitigate the audio impact, and the processing of the captured audio to mitigate the audio impact.

In some embodiments, the transfer function generation process may be used to generate a transfer function for an input device with additional transfer functions being generated (or otherwise obtained) which represent the variation in audio propagation due to factors external to the input device—such as the surface on which the input device rests, or how the input device is held. In such embodiments, the noise cancelling unit 1030 may be configured to select two or more transfer functions, and to combine these (or apply them successively) in order to obtain a more accurate representation of the audio impact associated with a particular sound.

It is also considered that the noise cancellation process is not limited to cancellation of audio generated at the input device itself. For instance, a transfer function may be generated for an input device that is indicative of audio propagation of a sound outside of the input device. This can be used to estimate the audio impact on a microphone external to the input device (such as at a second input device, for instance another player's controller or a second device operated by the same user); this information may be used to enable an inter-device noise cancellation in which a more accurate noise cancellation for external sound sources (such as other input devices) can be realised.

The arrangement of FIG. 10 is an example of a processor (for example, a GPU and/or CPU located in a games console or any other computing device) that is operable to generate a transfer function indicating audio transmission characteristics of an input device associated with a processing device and to perform a noise cancellation process, and in particular is operable to:

determine one or more parameters of the input device, wherein the parameters include a location of a microphone associated with the input device and a location of one or more respective input and/or output elements associated with the input device;

determine one or more characteristics of audio transmission between respective input and/or output elements and the microphone, wherein the characteristics include one or more of an attenuation, resonance, and/or change in frequency profile of audio associated with the respective input and/or output element; and generate a transfer function in dependence upon the determined audio characteristics; and perform a noise cancellation process for audio corresponding to one or more inputs and/or outputs of the input device in dependence upon the generated transfer function.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system comprising:

a feedback device comprising one or more elements operable to generate an output in response to an input from a processing device;

a microphone operable to capture one or more audio inputs;

an input detection unit operable to detect one or more inputs to the feedback device from the processing device; and a response generation unit operable to generate a response to the detected input in dependence upon the input and at least a distance between an element associated with the corresponding output and the microphone.

2. A system according to clause 1, wherein the microphone is provided as a part of the feedback device.

3. A system according to any preceding clause, wherein the elements comprise one or more speakers and/or haptic feedback units.

4. A system according to any preceding clause, wherein the input detection unit is operable to detect inputs using captured audio indicating a corresponding output.

5. A system according to any preceding clause, wherein the input detection unit is operable to detect inputs in dependence upon control signals in the input provided to the feedback device by the processing device.

6. A system according to any preceding clause, wherein the response generation unit is operable to generate an audio response for output by a speaker associated with the feedback device.

7. A system according to any preceding clause, wherein the response generation unit is operable to generate a response for output to an audio processing unit operable to modify audio inputs captured by the microphone.

8. A system according to any preceding clause, wherein the response generation unit is operable to generate a response in dependence upon one or more physical properties of the feedback device.

9. A system according to clause 8, wherein the physical properties include one or more of the size, shape, structure, material, and/or sound conductivity.

10. A system according to any preceding clause, wherein the response generation unit is operable to generate a response in dependence upon one or more operational parameters of the feedback device, including parameters indicating how the feedback device is held by the user.

11. A system according to any preceding clause, wherein the input detection unit is provided at the processing device and is operable to detect inputs before they are provided to the feedback device.

12. A system according to clause 11, wherein the response to the detected input is provided to the feedback device in association with the detected input.

13. A method for use with a system comprising a feedback device comprising one or more elements operable to generate an output in response to an input from a processing device, and a microphone operable to capture one or more audio inputs, the method comprising:

detecting one or more inputs to the feedback device from the processing device; and generating a response to the detected input in dependence upon the input and at least a distance between an element associated with the corresponding output and the microphone.

14. Computer software which, when executed by a computer, causes the computer to carry out the method of clause 13.

15. A non-transitory machine-readable storage medium which stores computer software according to clause 14.

The invention claimed is:

1. A system comprising:

a feedback device comprising one or more elements operable to generate an output in response to one or more inputs from a processing device;

a microphone operable to capture one or more audio inputs;

an input detection unit operable to detect the one or more inputs to the feedback device from the processing device by analyzing data received from the processing device; and a response generation unit operable to generate a response in dependence on the detection by the input detection unit of the one or more inputs from the processing device and at least a distance between an element associated with the output and the microphone, wherein the input detection unit is operable to detect the one or more inputs from the processing device in dependence upon control signals within the one or more inputs provided to the feedback device by the processing device, and wherein the response generation unit is operable to generate a response for output to an audio processing unit operable to modify audio inputs captured by the microphone.

2. The system of claim 1, wherein the microphone is provided as a part of the feedback device.

3. The system of claim 1, wherein the elements comprise one or more speakers and/or haptic feedback units.

4. The system of claim 1, wherein the input detection unit is operable to detect the one or more inputs using captured audio indicating a corresponding output.

5. The system of claim 1, wherein the response generation unit is operable to generate an audio response for output by a speaker associated with the feedback device.

6. The system of claim 1, wherein the response generation unit is operable to generate a response for output to an audio processing unit operable to modify audio inputs captured by the microphone.

7. The system of claim 1, wherein the response generation unit is operable to generate a response in dependence upon one or more physical properties of the feedback device.

8. The system of claim 7, wherein the physical properties include one or more of the size, shape, structure, material, and/or sound conductivity.

9. The system of claim 1, wherein the response generation unit is operable to generate a response in dependence upon one or more operational parameters of the feedback device, including parameters indicating how the feedback device is held by the user.

10. The system of claim 1, wherein the input detection unit is provided at the processing device and is operable to detect the one or more inputs before they are provided to the feedback device.

11. The system of claim 10, wherein the response generated by the response generation unit is provided to the feedback device in association with the detected input.

12. A method for use with a system comprising a feedback device comprising one or more elements operable to generate an output in response to one or more inputs from a processing device, and a microphone operable to capture one or more audio inputs, the method comprising:

detecting the one or more inputs to the feedback device from the processing device by analyzing data received from the processing device; and generating a response in dependence on the detecting of the one or more inputs from the processing device and at least a distance between an element associated with the output and the microphone, wherein the detecting includes detecting the one or more inputs from the processing device in dependence upon control signals within the one or more inputs provided to the feedback device by the processing device, and wherein the generating a response includes generating a response for output to an audio processing unit operable to modify audio inputs captured by the microphone.

13. A non-transitory machine-readable storage medium which stores computer software which, when executed by a computer, causes the computer to perform a method for use with a system comprising a feedback device comprising one or more elements operable to generate an output in response to one or more inputs from a processing device, and a microphone operable to capture one or more audio inputs, the method comprising:

detecting the one or more inputs to the feedback device from the processing device by analyzing data received from the processing device; and generating a response in dependence on the detecting of the one or more inputs from the processing device and at least a distance between an element associated with the output and the microphone, wherein the detecting includes detecting the one or more inputs from the processing device in dependence upon control signals within the one or more inputs provided to the feedback device by the processing device, and wherein the generating a response includes generating a response for output to an audio processing unit operable to modify audio inputs captured by the microphone.

* * * * *